Nov. 18, 1958
H. H. TIEDEMANN
2,861,090
PROCESS OF PREPARING β-SULFOALKYLESTERS
OF CARBOXYLIC ACIDS
Filed Oct. 5, 1954
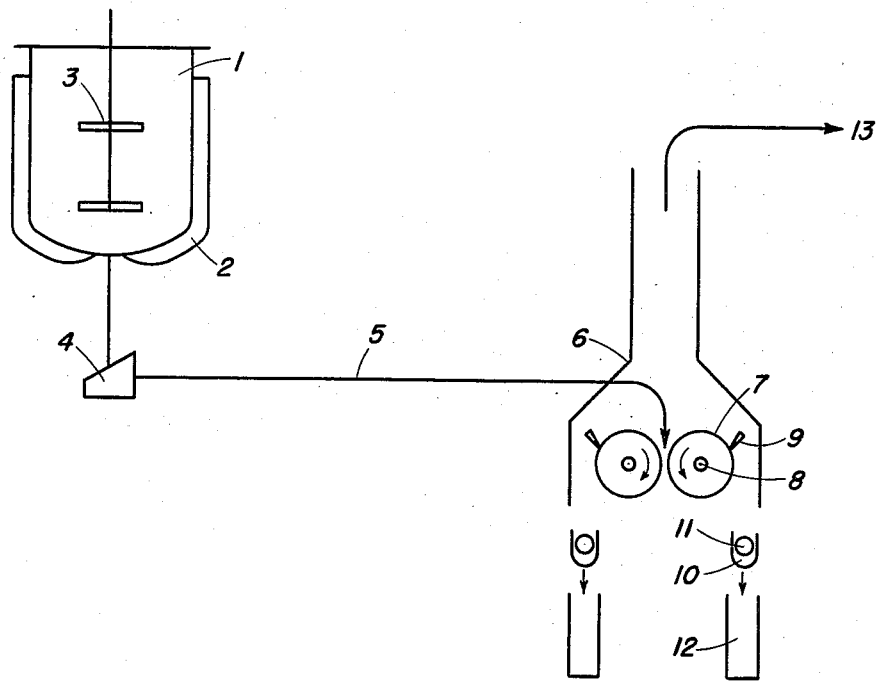
Herman H. Tiedemann
INVENTOR
BY
ATTORNEYS United States Patent Office 2,861,090
Patented Nov. 18, 1958

2,861,090

PROCESS OF PREPARING β-SULFOALKYLESTERS OF CARBOXYLIC ACIDS

Herman H. Tiedemann, Fanwood, N. J., assignor to General Aniline & Film Corporation, New York, N. Y., a corporation of Delaware Application October 5, 1954, Serial No. 460,438

6 Claims. (Cl. 260—400)

This invention relates to an improved process of preparing esters of carboxylic acid chlorides and 2-hydroxy alkane sulfonic acid salts of alkali metals, alkaline earth metals, periodic table group 2B metals, and organic bases.

The reaction of fatty acids, fatty acid chlorides and fatty acid esters with 2-amino- or 2-hydroxy-alkane sulfonic acids and the alkali metal salts thereof to yield anionic surface active materials useful as wetting, cleansing, softening and dispersing agents is well known. In U. S. P. 1,932,180 several processes are described for the preparation of such surface active materials. The processes fall into three categories wherein (1) a free fatty acid dissolved in an aliphatic amine is mixed with an amino-alkane sulfonic acid (taurine) and then heated to boiling, (2) an alkyl ester of a fatty acid is heated with the sodium salt of an amino-alkane sulfonic acid and (3) a carboxylic acid chloride is treated in aqueous medium with a 2-amino-alkane sulfonic acid in the presence of caustic soda. The latter process is the conventional batch method of manufacture and involves charging the solid alkali metal salt of 2-hydroxy alkane sulfonic acid and the carboxylic acid chloride to a kettle equipped with a highly powered agitator and breaker arms or to a sigma bladed kneading machine, i. e. a Werner-Pfleiderer. After completion of the reaction at approximately 140° C. the reaction mass is cooled and grounded in the reactor. The major portion of the hydrochloric acid by-product is evolved over a very short period, near the peak reaction temperature. Recovery of the by-product requires a large expensive recovery system due to the high intermittent loading.

The conventional batch method not only involves high capital requirements, high operating expenses, and low product activity, but, in addition yields a product which is dark in color with a disagreeable odor. This darkening is highly undesirable since for commercial applications the product should be as nearly colorless and substantially odorless as possible.

To provide a process which was overcome the foregoing disadvantages, constitutes the principal object of the present invention.

Other objects and advantages will appear from the following specification:

I have found that by first grinding a solid alkali metal, alkaline earth metal, periodic table group 2B metal, or an organic base salt of a 2-hydroxy alkane sulfonic acid and intimately mixing it with a carboxylic acid chloride to form a homogeneous slurry, a reaction mixture is formed which when fed continuously to a heated metallic surface provides for a continuous reaction of the mixture and yields a solid β-sulfoalkylester of the fatty acid useful as a surface active agent. By this process, when compared with the conventional batch process, the following advantages are obtained:

(1) Lower capital requirements
(2) Lower operating expenses
(3) Higher product activity
(4) Improved odor
(5) Improved color
(6) Continuous uniform evolution of by-product hydrochloric acid instead of intermittent high rate evolution In practicing the present invention, the alkali metal, alkaline earth metal, periodic table group 2B metal, or an organic base salt of a 2-hydroxy alkane sulfonic acid is ground in a conventional attrition mill to reduce the average particle size between 3 and 7 microns. The ground solid salt is mixed with the fatty acid chloride to form a homogeneous non-settling slurry. This mixing is preferably accomplishd in any suitable, separate container lined with glass or a sturctural material which is resistant to fatty acid chlorides. The container is equipped with a discharge line of sufficient diameter to permit the flow of the mixture of the slurry by gravity or the discharge line provided with a proportioning pump, so that the slurry may be fed continuously into the reaction chamber. The reaction chamber consists of the conventional hot rolls, a heated continuous belt, or a double drum drier, which is heated with 90 pounds of steam per square inch. The rolls or continuous belt may be heated in any conventional manner, such as, for example, infra-red lamps, electrically heated elements, steam coils positioned between the rolls or belt, etc. The temperature may range from 120°–170° C. As regards the double drum drier, the temperature corresponding to 90 pounds steam is approximately 166° C. The slurry is fed continuously into the heated rolls, belt or double drum drier and is deposited as a thin film on the surface of the rolls, belt or rotating hot surface of the drum drier to form a hard, semi-brittle film. The contact time required to form the film may range from 4 to 40 seconds, depending, of course, upon the temperature of the rolls, belt, or drum drier. The higher the temperature, the shorter is the contact time. As soon as the film is formed, it is lifted from the rolls, belt or drum drier by conventional doctor blades and deposited into a separate container made out of glass or non-corrosive material or placed in shallow pans. After cooling to room temperature, the film becomes hard and brittle, readily breakable and friable on grinding. The hydrochloric acid by-product is evolved continuously at a steady rate from the rolls, belt or double drum drier, and can be recovered in any conventional absorption system. The hard brittle broken film is then ground in the conventional manner.

The foregoing objects and disadvantages will appear more fully, by reference to the drawing in which there is illustrated a flow sheet for the continuous manufacture of the β-sulfoalkylesters of fatty acids.

Referring to the drawing, the solid salt of 2-hydroxy alkane sulfonic acid is ground in a conventional attrition mill for a sufficient period of time to reduce the average particle size to at least 10 microns and preferably between 3 and 7 microns. The ground solid is then intermittently or continuously mixed in vessel 1 equipped with a water cooling jacket 3 with the carboxylic acid chloride to form a homogeneous non-settling slurry. The slurry is mixed by means of agitator 3. After mixing, the slurry is fed continuously through proportioning pump 4 into line 5 which leads to the inlet of a conventional drum drier 6, the rolls 7 of which are heated with 90 pounds of steam per square inch. The steam inlet and outlet of these rolls is located at the opening 8. The rolls 7 of the drum drier rotate at a speed to form one complete cycle of 6–60 seconds during which the film formed is lifted from the rolls 7 by means of doctor blades 9 and deposited into a separate container 10 provided with a suitable conveying means 11 from which the final product is discharged into receivers 12. Hydrochloric acid as a by-product passes through the recovery system 13. The size of vessel 1 may vary and the feed stock can be prepared batch-wise or continuously. For practical purposes a 55 gallon stainless steel drum standing in a water trough for cooling and equipped with suitable mixing means may be employed for commercial manufacture. The proportioning pump 4 is constructed of stainless steel and has a capacity up to 9 gallons per hour. The feed line or feed line pump 5 is also constructed of stainless steel. The conventional double drum drier 6 is usually a 25 square foot Buflovak drier equipped with chromium plated rolls 7 and is operated at 110 revolutions per minute. Larger units of this type of apparatus may be employed for the purpose of the present invention. In such case they are equipped with stainless steel rolls. Here, too, the final product is removed by doctor blades 9 and carried out of the unit with water cooled stainless steel conveyor 10. The receivers 12 consist of stainless steel drums or hoppers or fiber drums. The hydrochloric absorption system 13 is the conventional one and capable of producing 20° Bé. muriatic acid.

As an alternative, instead of employing the reaction vessel 1 with agitating means 3, a large cylindrical tube with an outlet and inlet containing within its interior a screw-type mixer may also be efficiently employed.

In forming the slurry of the reactive components, the molar ratio of the salt of the 2-hydroxy alkane sulfonic acid to carboxylic acid chloride may be varied from 0.95:1 to 1.6:1.

The 2-hydroxy alkane sulfonic acids, which are converted into alkali metal, alkaline earth metal, periodic table group 2B metal or organic base salts, and employed in accordance with the foregoing process are characterized by the following general formulae.

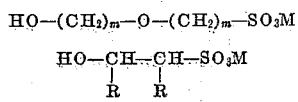

$$HO-(CH_2)_m-O-(CH_2)_m-SO_3M$$

$$\underset{R\quad R}{HO-CH-CH-SO_3M}$$

wherein R represents either hydrogen, lower alkyl, methyl, ethyl, propyl, butyl, etc., M represents an alkali metal e. g. lithium, sodium and potassium; alkaline earth metal, e. g. calcium, strontium, barium, periodic table group 2B metal, e. g. magnesium, etc., or an organic base, e. g. pyridine, quinoline, triethanolamine, etc., and m represents 1 or 2. It is to be noted that any organic base, whether aliphatic or alicyclic, saturated or unsaturated, may be employed instead of the aforementioned specific bases.

As examples of 2-hydroxy alkane sulfonic acids that are esterified with carboxylic acid chlorides, the following are illustrative:

Isethionic acid
β-Hydroxy-dimethylether-β-sodium sulfonate
β-Hydroxy-diethylether-β-sodium sulfonate
2-hydroxy-2-methylethane sulfonic acid
1,2-dimethyl-2-hydroxy sulfonic acid
2-hydroxy-2-ethyl-sulfonic acid
2-hydroxy-propane-sulfonic acid
2-hydroxy-2-butane-sulfonic acid
2-hydroxy-1-butane-sulfonic acid The carboxylic acid, in the form of its acid chloride, which may be employed in the esterification reaction with the salt of the 2-hydroxy alkane sulfonic acid, is any carboxylic acid either saturated or unsaturated, whether aliphatic or alicyclic. It is to be noted that the nature and character of the carboxylic acid is immaterial so long as it contains a carboxylic acid group and has a minimum of 6 carbon atoms. Acids of this type may be caproic acid, capryllic acid, capric acid, lauric acid, myristic acid, palmitic acid, stearic acid, oleic acid, linoleic acid, tall oil acids, naphthenic acids, abietic acids, etc., alkyl benzoic acids such as, dodecylbenzoic acid, nonylbenzoic acid, octylbenzoic acid, acids from oxo alcohols and aldehydes, acids from oxidized petroleum fractions, etc., alkylated phenyl acetic acids, e. g. p-decylphenyl acetic acid, m-nonylphenyl acetic acid, etc., acid mixtures from various natural plant and animal oils such as olive, tallow, castor, peanut, coconut, soybean, cottonseed, ucahuba, linseed; fish oils such as cod, herring, menhaden, etc., neat's foot, sperm, palm, corn, butter, babassu, kapok, hempseed, mustard, rubberseed, rape, safflower, sesame, etc., may also be employed.

The salts of the 2-hydroxyalkane sulfonic acids are readily prepared by neutralization of the acids with an equivalent amount of alkali metal, alkaline earth metal, or a periodic table group 2B metal hydroxide or carbonate, or an organic base in the conventional manner.

The esterification reaction is carried out at approximately 120°–170° C. The heat necessary to reach these temperatures is provided by the aforementioned elements. At the specified temperature ranges, preferably around 140° C., the reaction mass is a putty-like material and is deposited as a thin film on the rotating hot rolls into a hard, semi-brittle film by the time it passes through a 240° arc of rotating, requiring 4 to 40 seconds contact time. The film after leaving the drum is lifted by the conventional doctor blades and, cooling to room temperature, becomes a hard, brittle, broken film which is friable on grinding.

The following examples will further illustrate the nature of the improved process which, however, is not to be considered limitative thereof. The parts given are all by weight.

*Example I*

A homogeneous, non-settling slurry consisting of 41.5 parts of coconut fatty acid chloride (88% purity) and 26 parts of ground sodium isethionate (98% purity) having a particle size of 3 microns was fed to a 25 square foot double drum drier as illustrated in the accompanying drawing. The final product obtained at receivers 12 consisted of 59 parts of a brittle material having a β-sulfoethylester content of 87%.

*Example II*

A non-settling homogeneous slurry consisting of 120 parts of oleic fatty acid chloride (90% purity) and 72 parts of ground sodium isethionate (98% purity) having a particle size of 4 microns was fed to a 2 square foot double drum drier. 160 parts of a hard, brittle product having a β-sulfoethylester content of 83% were obtained.

*Example III*

Example I was repeated with the exception that 41.5 parts of the coconut fatty acid chloride and 26 parts of ground sodium isethionate were replaced by 1 part of ground 2-hydroxy propane sodium sulfonate having a particle size of 5 microns and 2.1 parts of abietic acid chloride, respectively.

*Example IV*

Example I was repeated with the exception that 41.5 parts of coconut oil fatty acid chloride and 26 parts of ground sodium isethionate were replaced by 1 part of ground 2-hydroxy-butane sodium sulfonate having a particle size of 3 microns and 1.3 parts of a commercial mixture of naphthenic acid chloride prepared from a commercially available naphthenic acid mixture having an apparent molecular weight of 200.

*Example V*

Example I was again repeated with the exception that the coreactants were replaced by 2 parts of dodecyl benzoic acid chloride and 1 part of ground 2-hydroxy-propane sodium sulfonate having a particle size of 7 microns.

The yields of the products of Examples III–V inclusive amounted to approximately 85%.

Various modifications of this invention will occur to persons skilled in the art and it is, therefore, understood that the patent granted shall only be limited by the appended claims.

I claim:

1. A continuous process for preparing β-sulfoalkyl-esters of carboxylic acids which comprises grinding, to a particle size ranging between 3 and 10 microns, a salt of a 2-hydroxyalkane sulfonic acid selected from the class consisting of those of the following formulae:

$$HO-(CH_2)_m-O-(CH_2)_mSO_3M$$

and $$HO-\underset{R}{CH}-\underset{R}{CH}-SO_3M$$

wherein R represents a member selected from the class consisting of hydrogen and lower alkyl, M represents a salt-forming group selected from the class consisting of alkali metals, alkaline earth metals, metals of periodic table group 2B, triethanolamine, quinoline and pyridine, and m represents an integer of from 1 to 2, intimately mixing the said ground salt with a carboxylic acid chloride of at least 6 carbon atoms selected from the group consisting of aliphatic and alicyclic carboxylic acid chlorides devoid of reactive interfering substituents to form a homogeneous non-settling slurry, continuously feeding said slurry to a metallic surface heated to approximately 120°–170° C., and recovering the said β-sulfoalkylester as a broken film which is friable on grinding.

2. The process according to claim 1 wherein the carboxylic acid chloride is coconut acid chloride.

3. The process according to claim 1 wherein the carboxylic acid chloride is oleic acid chloride.

4. The process according to claim 1 wherein the carboxylic acid chloride is abietic acid chloride.

5. The process according to claim 1 wherein the carboxylic acid chloride is naphthenic acid chloride.

6. The process according to claim 1 wherein the carboxylic acid chloride is dodecylbenzoic acid chloride.

References Cited in the file of this patent

UNITED STATES PATENTS

| | | |
|---|---|---|
| 1,881,172 | Daimler et al. | Oct. 4, 1932 |
| 1,916,776 | Steindorff et al. | July 4, 1933 |
| 2,236,541 | Katzman | Apr. 1, 1941 |
| 2,293,265 | Mikeska | Aug. 18, 1942 |

OTHER REFERENCES

Hoyt: German Chemical Developments in Synthetic Detergents and Wetting Agents, PB–3868, 1945, pp. 20 and 30.